April 16, 1968 SHIGEJI HASEGAWA 3,377,856
FLOW METER FOR LIQUEFIED PETROLEUM GAS
Filed Sept. 22, 1964
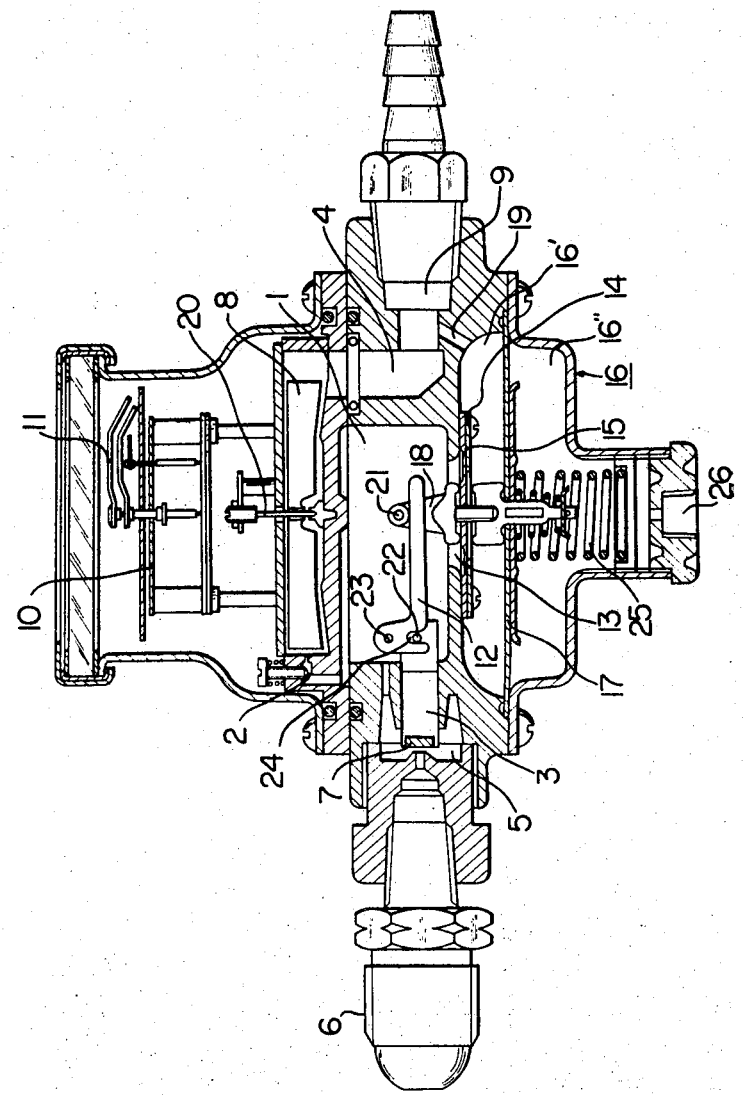
Shigeji Hasegawa
INVENTOR
BY

United States Patent Office 3,377,856
Patented Apr. 16, 1968

3,377,856
FLOW METER FOR LIQUEFIED PETROLEUM GAS
Shigeji Hasegawa, Tenryu, Japan, assignor to Yazaki Meter Company Limited, Tokyo, Japan
Filed Sept. 22, 1964, Ser. No. 398,354
Claims priority, application Japan, Oct. 15, 1963, 38/77,364
3 Claims. (Cl. 73—199)

ABSTRACT OF THE DISCLOSURE

A combined flow metering and pressure regulating device for liquefied petroleum gas is disclosed as including an inlet chamber having a small area opening through one wall which is closed by an auxiliary diaphragm. The auxiliary diaphragm is located in a diaphragm chamber divided, by a relatively large area flexible main diaphragm, into an inner section including the auxiliary diaphragm and an outer section. The inner section is subjected to the output pressure. Valve operating means interconnects both the auxiliary diaphragm and the main diaphragm to the inlet valve.

The relative sensitivity of the auxiliary diaphragm and the main diaphragm are such that normally the main diaphragm controls opening and closing of the inlet valve responsive to the outlet pressure. However, in response to an excessive inlet pressure in the inlet chamber, the auxiliary diaphragm closes the inlet valve independently of the outlet pressure then affecting the main diaphragm.

---

The present invention relates to a flow meter for liquefied petroleum gas.

More particularly, it relates to a flow meter for liquefied petroleum gas, having a novel pressure controlling means.

The pressure of fluid, such as city coal gas supplied by a gas company through a gas holder, or city water, is regulated in advance of its service and naturally it is supplied under a constant pressure, so that users may obtain at any time their desired flow by simply turning on the gas or water cock according to their demands without considering on the pressure of the fluid supplied to them.

Whereas, liquefied petroleum gas, the object to be measured by the present invention flow meter, has no such convenience, since it is contained in a container such as a pressure bomblike vessel under high pressure and its pressure has to be regulated by the user himself. Not only is the pressure of the gas generally too high to be used as is, but the pressure varies momentarily in using gas, and consequently a constant flow is difficult to obtain.

In order to overcome these disadvantages which liquefied petroleum gas unavoidably has by its nature, flow meters for liquefied petroleum gas are provided with a pressure control means, whereby the flow of gas is metered after its pressure has been regulated.

These conventional flow meters have, briefly speaking, such constructions that gas led into a pressure controlling chamber of the meter and thereafter injected through an inlet valve rotates vanes installed in the meter, and the angular velocity of the rotary movements of the vanes is indicated through a proper indicating mechanism which is interlinked to the vanes.

However, the flow meters for liquefied petroleum gas of this type have had a serious disadvantage in that inlet valves installed in the meter can not be properly and automatically regulated in accordance with the pressure exerted by the gas at an outlet, namely, in accordance with the flow at the outlet, since said inlet valve is actuated simply by a diaphragm which is operated by gas pressure in a pressure controlling chamber provided in the meter.

The flow meter for liquefied petroleum gas of the present invention has solved the above defect which known flow meters have had, by providing a novel pressure controlling means which is regulated in response to the variations of gas pressure at an outlet.

Thus, it is an object of the present invention to provide a flow meter, for liquefied petroleum gas, having a pressure controlling means, in which the operation of an inlet valve may be regulated by a diaphragm which senses the pressure of gas at an outlet, and the flow of gas may be maintained constant under a desired pressure.

It is another object of the present invention to provide a flow meter for liquefied petroleum gas furthermore provided with an auxiliary diaphragm which responds to the gas pressure in a pressure controlling chamber and can actuate an inlet valve to close an inlet opening when an extraordinary high pressure is present in the chamber.

With the above objects and other objects which will be described hereinafter, the flow meter for liquefied petroleum gas of the present invention will be explained in detail in the ensuing specification with reference to an embodiment illustrated in the accompanying drawing.

The accompanying drawing shows a vertical section of the flow meter of the present invention, in which a pressure controlling chamber 1 has an inlet opening 5 which leads gas into the chamber through an inlet valve 7, and a gas passage 4 which leads the gas from the chamber into an outlet opening 9 through a pressure reducing nozzle 2 and vanes 8. Said pressure controling chamber 1 is further provided with an opening 13 facing an auxiliary diaphragm 15 which is fitted by screws, together with a metal plate 14 having a flange, to an outside wall of the chamber 1, said opening 13 being separated by the auxiliary diaphragm 15 from diaphragm chamber 16 which is partitioned into two chambers, namely, upper and lower chamber 16' and 16", respectively by a principal or main diaphragm 17 provided in diaphragm chamber 16. The flow meter of the present invention furthermore is uniquely provided with a pressure inducing passage 19, one end of which opens into the gas passage 4 adjacent outlet opening 9 and another end of which connects to the upper chamber 16' of the diaphragm chamber 16.

The inlet valve 7 is fitted to the forward end of a rod 3, said rod being provided on its side a pin 22. The pin 22 engages with a concave portion 24 of a lever 12 which is pivotally fitted by a pivot 23 on a wall of the pressure controlling chamber 1, and lever 12 turns on the pivot 23. An end of the lever 12 engages a projection 21 provided at an upper part of an operating rod 18 which extends through the centers of the auxiliary diaphragm 15 and the principal diaphragm 17, and is secured to both thereof.

In the flow meter comprising the above described constructions, gas supplied by an inlet pipe 6 passes through the inlet opening 5 while acting on the inlet valve 7, and is led to the pressure controlling chamber 1. From the said chamber, the gas is injected through the pressure reducing nozzle 2 in the direction of the vanes 8, thereby the vanes are rotated. The angular velocity of the vanes thus rotated is transmitted to a metering device 10 by means of a shaft 20 fitted to the vanes, and the movements of said metering device are observed through the medium of an indicator 11.

The gas, which has turned the vanes, reaches the outlet opening 9, but also is led to the upper diaphragm chamber 16' via pressure inducing passage 19.

The resiliency of a spring 25, which supports the inner surface of the principal diaphragm 17 and is provided in the lower diaphragm chamber 16", is preliminarily adjusted by a screw nut 26 seating the rear end of the said spring, so that the principal diaphragm 17 can sense the pressure of gas which exceeds a predetermined working pressure.

In case where the pressure in the outlet opening exceeds a predetermined amount, the pressure of gas inside the upper chamber 16' also increases, resulting in pressing down the principal diaphragm against the bias of the spring 25 and consequently pushing down the operating rod 18 fitted to said principal diaphragm.

In accordance with descending movements of the operating rod 18, the lever 12, which engages said rod 18, is also turned down on the pivot 23, the concave portion 24 of the lever pushing forward the inlet valve 7 toward the inlet opening 5, through its engagement with the pin 22.

Thus, the inlet opening is closed, and the flow of gas is thereby stopped. When the pressure exerted onto the outlet opening decreases to the predetermined standard, the diaphragm 17 returns to its normal position and the flow of gas starts again, resulting in supplying gas to the outlet opening always at a predetermined constant pressure and amount.

The auxiliary diaphragm 15 which directly responds to the gas pressure in the pressure controlling chamber 1 should be less sensitive compared to the principal diaphragm 17, so that it may actuate the inlet valve 7 to close the inlet opening 5 only in case an extraordinary high pressure is exerted in the pressure controlling chamber 1.

While the flow meter of the present invention has been described in the above with reference to an embodiment thereof illustrated in the accompanying drawing, it is to be noted that various modifications of its constructions may be made within the scope of the invention.

What is claimed:

1. A flow meter for gas evolved from liquefied petroleum gas comprising, in combination, a valve body formed with an inlet chamber, a gas inlet opening for said chamber, and a gas outlet opening; an inlet valve controlling flow through said inlet opening into said chamber; a flow metering device on said body, including wall means forming a rotor chamber; said wall means having a passage formed therethrough and interconnecting said chambers for flow of gas past said rotor to a second passage through said wall means connected to said gas outlet; said inlet chamber having a substantially planar wall formed with a relatively small area opening therethrough; a substantially planar flexible auxiliary diaphragm closing said pressure opening in said substantially planar wall, and having only a small area of one surface subjected to the pressure in said inlet chamber through said small area opening; means, including said body and said auxiliary diaphragm, defining a diaphragm chamber; a relatively large free area flexible main diaphragm dividing said diaphragm chamber into an inner section, defined in part by said auxiliary diaphragm, and an outer section; passage means formed in said body and connecting said gas outlet to said inner section of said diaphragm chamber for subjection of said main diaphragm to the gas outlet pressure; and valve operating means connected to said inlet valve and including a relatively rigid part connected to and interconnecting both said diaphragms, said valve operating means, responsive to increasing gas outlet pressure effective in said inner section of said diaphragm chamber on said main diaphragm moving said inlet valve in an inlet closing direction; the relative area of said auxiliary diaphragm and said main diaphragm being such that said auxiliary diaphragm has substantially no effect upon the inlet valve controlling action exerted by said main diaphragm; said auxiliary diaphragm, responsive to excessive inlet pressure, closing said inlet valve independently of the outlet pressure effective on said main diaphragm.

2. A flow meter for gas evolved from liquefied petroleum gas comprising, in combination, a valve body formed with an inlet chamber, a gas inlet opening for said chamber, and a gas outlet opening; an inlet valve controlling flow through said inlet opening into said chamber; a flow metering device on said body, including wall means forming a rotor chamber; said wall means having a passage formed therethrough and interconnecting said chambers for flow of gas past said rotor to a second passage through said wall means connected to said gas outlet; said inlet chamber having a substantially planar wall formed with a relatively small area opening therethrough; a substantially planar flexible auxiliary diaphragm closing said pressure opening in said substantially planar wall, and having one surface subjected to the pressure in said inlet chamber; means, including said body and said auxiliary diaphragm, defining a diaphragm chamber; a relatively large free area flexible main diaphragm dividing said diaphragm chamber into an inner section, defined in part by said auxiliary diaphragm, and an outer section; passage means formed in said body and connecting said gas outlet to said inner section of said diaphragm chamber for subjection of said main diaphragm to the gas outlet pressure; and valve operating means connected to said inlet valve and including a relatively rigid part connected to and interconnecting both said diaphragms, said valve operating means, responsive to increasing gas outlet pressure effective in said inner section of said diaphragm chamber on said main diaphragm moving said inlet valve in an inlet closing direction; the relative area of said auxiliary diaphragm and said main diaphragm being such that said auxiliary diaphragm has substantially no effect upon the inlet valve controlling action exerted by said main diaphragm, wherein said auxiliary diaphragm, which is directly responsive to the gas pressure in said inlet chamber, is less sensitive compared to the principal diaphragm, so that said auxiliary diaphragm actuates said inlet valve to close the inlet opening only responsive to an extraordinary high pressure in the meter.

3. A flow meter, as claimed in claim 1, including a spring in said outer section of said diaphragm chamber and having one end engaged with said main diaphragm; and spring tension adjusting means engaged with the opposite end of said spring to adjust the desired working pressure of said flow meter.

References Cited
UNITED STATES PATENTS

| | | |
|---|---|---|
| 1,841,059 | 1/1932 | Rush. |
| 2,255,219 | 9/1941 | Hutchinson et al. _____ 73—199 |
| 2,784,590 | 3/1957 | Stewart _____ 73—199 |
| 3,183,712 | 5/1965 | Stevenson _____ 73—299 X |
| 3,221,550 | 12/1965 | Yashima _____ 73—199 |

RICHARD C. QUEISSER, *Primary Examiner.*

E. D. GILHOOLY, *Assistant Examiner.*